T. W. HICKS.
METHOD OF PLANTING.
APPLICATION FILED JAN. 15, 1917.
1,226,515.
Patented May 15, 1917.
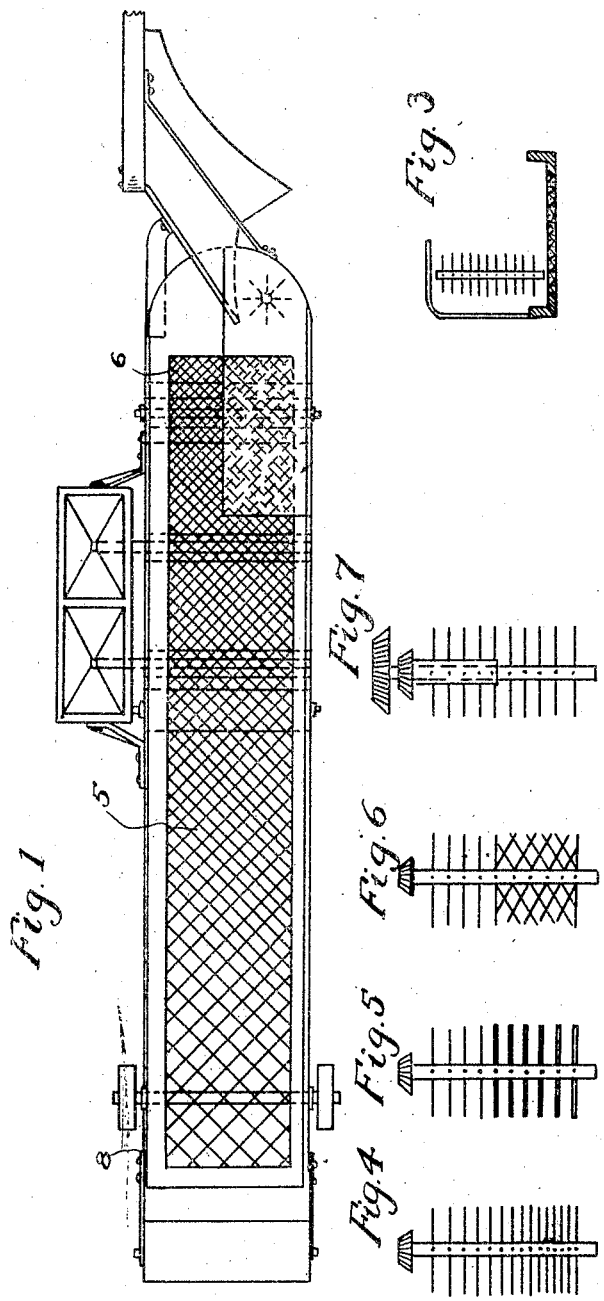
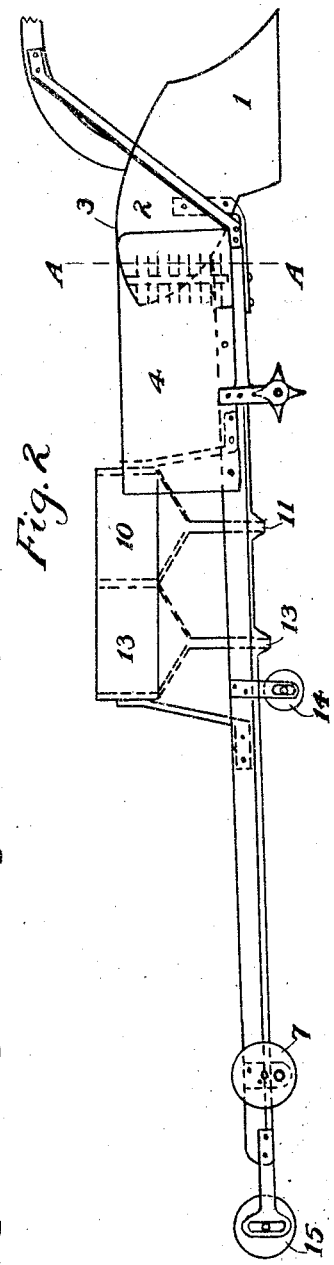
Inventor:
Thomas W. Hicks.
by C. D. Enochs
Attorney.

UNITED STATES PATENT OFFICE.

THOMAS W. HICKS, OF MINNEAPOLIS, MINNESOTA.

METHOD OF PLANTING.

1,226,515.  Specification of Letters Patent.  Patented May 15, 1917.

Original application filed August 21, 1916, Serial No. 116,147. Divided and this application filed January 15, 1917. Serial No. 142,566.

*To all whom it may concern:*

Be it known that I, THOMAS W. HICKS, a citizen of the United States, and a resident of Minneapolis, in the county of Hennepin and State of Minnesota, have invented new and useful Improvements in Methods of Planting, of which the following is a specification.

This invention relates to a method of preparing ground and introducing seed therein, and, if desired, also introducing fertilizer into the prepared ground in such a manner as to give the seed the most advantageous arrangement of soil for its growth.

For an ideal condition of soil to receive seed, the soil should be worked in some manner so as to be in a finely pulverized condition, and in most crops the granules of the pulverized soil should be smaller at the bottom, or root section of the seed bed and increase in size to the top, or surface section. The sub-soil, or under surface from which the soil was removed before it is again deposited, should also be punctured or scored so as to give a more intimate relation between the root section and the sub-soil, increase the surface of contact between the pulverized soil and the sub-soil and allow moisture to pass more readily through the surface of contact.

The seed should be deposited in the prepared bed at a uniform depth whether it is sown broadcast or in the manner in which it is at the present time planted by drills.

Fertilizer should be applied to the soil, either distributed uniformly through the soil or deposited in a layer, or layers a certain depth above or below the seed or a combination of these methods, the root section should be packed and the remainder of the soil then deposited on the packed root section.

I have conceived a new method of planting seed to make ideal conditions, the method consisting of a certain sequence of operations which may be departed from more or less within the limit of this invention and this specification is a divisional of my co-pending application for method of preparing seed beds, Serial #116147, filed August 21, 1916.

In my co-pending application of even date for improvements in planters, I have described and claimed certain mechanism that will perform the functions described in this application, but this application has to do only with the method of planting the seed and does not contemplate any particular type of machine or machines.

To illustrate the method to be hereinafter claimed reference is had to the drawing which accompanies and forms a part of this specification in which Figure 1 is a plan view of one type of tiller described and claimed in my co-pending application hereinbefore cited. Fig. 2 is a side elevation of the same. Fig. 3 is a section taken on the line A A, Fig. 2, and Figs. 4, 5, 6, and 7 are views of various types of rotors used in varying soil conditions.

The tiller may be drawn by any suitable source of power, and the plow share 1 lifts a certain depth of soil and with the mold board 2 turns this soil onto the rotor 3 which is driven at a comparatively high velocity.

The soil is pulverized by the rotor and guided by the shield 4, is deposited on the screen 5 at the forward end 6.

The rear end of the screen 5 is supported by an eccentrically mounted wheel 7 so as to agitate the screen, and the soil deposited on the end 6 is thus worked backwardly toward the end 8.

The result, the soil is lifted by the plow share broken into granules, the smaller sizes of granules falling from the forward end of the screen and the larger sizes from the back end of the screen so the small size granules will be covered by the large sized granules as the machine is drawn forwardly.

A pronged roller 9 serves to puncture the subsoil before the pulverized dirt falls back thereon, a hopper 10 deposits seed therein, either in rows as a drill would do, or broadcast, a certain amount of soil is deposited between the feeding mechanism 11 of the hopper 10 and the feeding mechanism 12 of the hopper 13, which is adapted to deposit suitable fertilizer on the soil deposited over the planted seed.

A weighted roller 14 packs the root section and the remainder of the pulverized soil drops through the coarser meshes of the screen and the completed seed bed is packed by the weighted roller 15.

The different types of rotors shown in Figs. 4 to 7 inclusive, are utilized in soils of various conditions and tend to, in themselves, distribute soil in different sizes of granules so that this method can actually be worked without the use of the screen 5.

By increasing the number of hoppers and changing their position, I am able to place the seed either sown broadcast or drilled at any desired depth and arrange the layers of fertilizer in any desired relation with the planted seed.

While I have described my invention and illustrated it in one particular form, I do not wish myself to be understood as confining myself to this particular method, as it is evident that my invention may be embodied in various ways and different constructions within the scope of the following claims.

Claims:

1. The method of seed planting comprising the lifting and pulverizing of a portion of the soil, returning the pulverized soil to the sub-soil in a shower and introducing seed during the act of the return of the soil to the sub-soil in a plane intermediate of the plane of the sub-soil and the upper surface of the completed seed bed.

2. The method of seed planting, comprising the lifting of a portion of the soil, pulverizing the soil so lifted, returning the pulverized soil to the subsoil and introducing seed into the pulverized soil during the act of its being returned to the subsoil.

3. The method of seed planting, comprising the lifting and pulverizing of a portion of the soil, returning the pulverized soil to the subsoil so that the finer granules are deposited on the subsoil forming a root bed, introducing seed onto the surface of the root bed and covering the seeded root bed with the remainder of the pulverized soil.

4. The method of seed planting, comprising the lifting and pulverizing of a portion of the soil, puncturing or scoring the subsoil, returning the finer granules onto the punctured or scored subsoil forming a root bed thereon, introducing seed on to the root bed so formed, and returning the remainder of the pulverized soil onto the seeded root bed.

5. The method of seed planting, comprising the lifting and pulverizing of a portion of the soil, puncturing or scoring the subsoil, returning a portion of the pulverized soil onto the subsoil forming a root bed, introducing seed onto the surface of the root bed so formed, packing the seeded root bed, covering the seeded root bed with another portion of the pulverized soil, introducing fertilizer on the further portion of the pulverized soil, covering the seeded and packed root bed, and covering the fertilizer with the remainder of the pulverized soil.

6. The method of seed planting, comprising the lifting and pulverizing of a portion of the soil, returning the finer granules of the soil so pulverized onto the subsoil forming a root bed thereon, introducing seed onto the root bed so formed and returning the larger granules of pulverized soil onto the top of the seeded root bed.

7. The method of seed planting, comprising the lifting and pulverizing of a portion of the soil, returning onto the subsoil the finer granules of pulverized soil forming thereby a root bed, introducing seed onto the root bed so formed, packing the root bed so formed and covering the packed and seeded root bed with the remainder of the pulverized soil.

8. The method of seed planting, comprising the lifting and pulverizing of a portion of the soil, puncturing or scoring the subsoil, depositing back onto the punctured subsoil the finer granules of the pulverized soil, introducing into the finer granules a fertilizer, depositing seed onto the root bed thus formed, packing the said root bed and covering the packed and seeded root bed with the remainder of the pulverized soil.

THOMAS W. HICKS.